United States Patent
Deng

(10) Patent No.: US 12,295,024 B2
(45) Date of Patent: May 6, 2025

(54) METHOD AND DEVICE FOR DATA FEEDBACK PROCESSING, AND NON-TRANSITORY PROCESSOR-READABLE STORAGE MEDIUM

(71) Applicant: SPREADTRUM COMMUNICATIONS (SHANGHAI) CO., LTD., Shanghai (CN)

(72) Inventor: Yun Deng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 629 days.

(21) Appl. No.: 17/367,309

(22) Filed: Jul. 2, 2021

(65) Prior Publication Data

US 2021/0410156 A1    Dec. 30, 2021

Related U.S. Application Data

(63) Continuation of application No. PCT/CN2020/071201, filed on Jan. 9, 2020.

(30) Foreign Application Priority Data

Jan. 11, 2019   (CN) .................. 201910027671.X

(51) Int. Cl.
*H04W 72/10*    (2009.01)
*H04W 28/24*    (2009.01)
(Continued)

(52) U.S. Cl.
CPC ........... *H04W 72/56* (2023.01); *H04W 28/24* (2013.01); *H04W 72/0446* (2013.01); *H04W 4/40* (2018.02)

(58) Field of Classification Search
CPC .... H04L 1/1854; H04L 5/0055; H04W 28/24; H04W 4/40; H04W 72/0446; H04W 72/56

See application file for complete search history.

(56) References Cited

U.S. PATENT DOCUMENTS 10,568,044 B2    2/2020 Takata et al.
10,805,395 B2 *  10/2020 Cavalcanti .............. H04W 4/44
(Continued)

FOREIGN PATENT DOCUMENTS

CN    102056225 A    5/2011
CN    102387470 A    3/2012
(Continued)

OTHER PUBLICATIONS

CN201910027671.X First Office Action dated Jan. 4, 2021.
(Continued)

*Primary Examiner* — Liton Miah
(74) *Attorney, Agent, or Firm* — Christensen O'Connor Johnson Kindness PLLC

(57) ABSTRACT

Provided are a method for data feedback processing and a device. The method is applied to a first terminal and includes: determining a plurality of second terminals as feedback receiving terminals, upon determining that feedback is required to be provided in a first time slot for first data sent by the plurality of second terminals; determining whether the first terminal supports simultaneous feedback; and determining, according to a service priority level upon determining that the first terminal does not support simultaneous feedback, a target terminal having the highest service priority level from the plurality of feedback receiving terminals, and sending, in the first time slot, feedback information to the target terminal having the highest service priority level.

17 Claims, 4 Drawing Sheets

(51) Int. Cl.
*H04W 72/04* (2023.01)
*H04W 72/0446* (2023.01)
*H04W 72/56* (2023.01)
*H04W 4/40* (2018.01)

(56) References Cited

U.S. PATENT DOCUMENTS

| | | | | |
|---|---|---|---|---|
| 11,096,197 | B2* | 8/2021 | Huang | H04W 72/535 |
| 11,356,216 | B2* | 6/2022 | Ekpenyong | H04L 5/0035 |
| 2014/0192740 | A1* | 7/2014 | Ekpenyong | H04L 5/0035 370/329 |
| 2019/0109677 | A1* | 4/2019 | Wang | H04L 5/1469 |
| 2020/0106566 | A1* | 4/2020 | Yeo | H04W 28/04 |
| 2024/0121839 | A1* | 4/2024 | Cheng | H04L 1/1861 |

FOREIGN PATENT DOCUMENTS

| | | |
|---|---|---|
| CN | 104113860 A | 10/2014 |
| CN | 106301720 A | 1/2017 |
| CN | 106507489 A | 3/2017 |
| CN | 106982087 A | 7/2017 |
| CN | 107135486 A | 9/2017 |
| CN | 107274720 A | 10/2017 |
| CN | 107483164 A | 12/2017 |
| CN | 107872300 A | 4/2018 |
| CN | 108322414 A | 7/2018 |
| CN | 108631968 A | 10/2018 |
| CN | 109075921 A | 12/2018 |
| EP | 3314917 A1 | 5/2018 |
| KR | 101569989 B1 | 11/2015 |
| WO | 2015163626 A1 | 10/2015 |
| WO | 2018168169 A1 | 9/2018 |

OTHER PUBLICATIONS

PCT/CN2020/071201 International Search Report and Written Opinion dated Mar. 31, 2020.
3GPP TSG RAN WG1 Meeting #95 dated Nov. 12, 2018.
EP 20738426.4 Extended European Search Report dated Sep. 19, 2022.

* cited by examiner

METHOD AND DEVICE FOR DATA FEEDBACK PROCESSING, AND NON-TRANSITORY PROCESSOR-READABLE STORAGE MEDIUM

CROSS-REFERENCE TO RELATED APPLICATIONS

This application is a continuation of International Application No. PCT/CN2020/071201, filed on Jan. 9, 2020, which claims priority to Chinese Patent Application No. 201910027671.X, filed on Jan. 11, 2019. All of the aforementioned applications are hereby incorporated by reference in their entireties

TECHNICAL FIELD

The present disclosure relates to the technical field of communications, and in particular, to a method for data feedback processing, a device for data feedback processing, and a non-transitory processor-readable storage medium.

BACKGROUND

An internet-of-vehicles system aims to improve road safety, improve traffic efficiency, and provide users with diverse streaming media services by means of communication between vehicles and other terminal devices (Vehicle to Everything, V2X). Other terminal devices include vehicles, handheld terminals, road side units (RSUs), networks, etc. The communication between vehicles and other terminal devices includes vehicle-to-vehicle (V2V) communication, vehicle-to-pedestrian (V2P) communication, vehicle-to-network (V2N) communication, etc. V2V, V2P, and V2I are collectively referred to as V2X.

The fifth-generation mobile communications refers to the fifth-generation mobile phone communication standards, also referred to as the fifth-generation mobile communication technology, abbreviated to 5G in English. 5G is also referred to as New Radio (NR for short), and can support V2X applications. NR has the advantages such as high rate, low latency, large coverage, and supporting terminals moving at high speed. In long-term evolution (LTE) technology, direct communication (ProSe Direct Communication, or referred to as Sidelink Communication) is introduced, and there may be a PC5 interface for direct communication between terminal devices. Vehicles and other terminal devices can communicate directly through the PC5 interface. NR is discussing how to introduce V2X technology and how to introduce V2X with feedback. Because one terminal (vehicle and other terminal devices) may communicate data with a plurality of terminals at the same time in V2X, there are a plurality of scenarios for information feedback. In the related art, a processing method for information feedback lacks diversity, and cannot satisfy information feedback requirements of different scenarios in V2X.

SUMMARY

In view of this, the present disclosure proposes a method for data feedback processing and a device for data feedback processing, so as to adapt to requirements for simultaneous information feedback for a plurality of pieces of received first data in the same time slot in various scenarios of V2X.

According to an aspect of the present disclosure, a method for data feedback processing is provided, the method is applied to a first terminal, and the method includes: determining a plurality of second terminals as feedback receiving terminals, upon determining that feedback is required to be provided in a first time slot for first data sent by the plurality of second terminals; determining whether the first terminal supports simultaneous feedback; and respectively sending, based on a plurality of consecutive feedback resources, in the first time slot over a designated frequency upon determining that the first terminal supports simultaneous feedback, corresponding feedback information to the plurality of feedback receiving terminals, where the feedback information is used to indicate a receiving status of the first terminal for the first data.

For the foregoing method, in a possible implementation, the determining whether the first terminal supports simultaneous feedback includes: determining, according to at least one of a transmission power supported by the first terminal, a distribution status of feedback resources obtained, feedback information that is required to be sent, and a feedback transmission power required to transmit the feedback information, whether the first terminal supports simultaneous feedback.

For the foregoing method, in a possible implementation, the method includes: upon determining that the first terminal does not support simultaneous feedback, determining, according to path losses of sidelinks between the first terminal and the feedback receiving terminals, a feedback transmission power for sending the feedback information to the feedback receiving terminals; determining whether the first terminal can send, at the feedback transmission power, the feedback information to the feedback receiving terminals, and determining, as a target terminal, a feedback receiving terminal that enables the first terminal to perform feedback information transmission at the feedback transmission power; and in a case of one target terminal, sending, in the first time slot over the designated frequency, the feedback information to the target terminal.

For the foregoing method, in a possible implementation, the method includes: in a case of more than one target terminal, selecting the target terminal having the highest service priority level from a plurality of target terminals according to the service priority level; and sending, in the first time slot over the designated frequency, the feedback information to the target terminal having the highest service priority level.

For the foregoing method, in a possible implementation, the method includes: upon determining that the first terminal does not support simultaneous feedback, sending a feedback adjustment request to at least one of the plurality of feedback receiving terminals, where the feedback adjustment request includes at least one of an adjustment to feedback interval information, an adjustment to reception time information about reception of the first data, and an adjustment to a designated frequency; receiving a feedback adjustment instruction sent by the feedback receiving terminal in response to the feedback adjustment request, where the feedback adjustment instruction includes at least one of adjusted feedback interval information, adjusted reception time information, and an adjusted designated frequency; and respectively sending, according to the feedback adjustment instruction, the corresponding feedback information to the plurality of feedback receiving terminals.

For the foregoing method, in a possible implementation, the respectively sending, according to the feedback adjustment instruction, the corresponding feedback information to the plurality of feedback receiving terminals includes at least one of the following: sending, in a second time slot over the adjusted designated frequency, corresponding feedback information to a feedback receiving terminal that sends a corresponding feedback adjustment instruction; sending, in a second time slot over the designated frequency, corresponding feedback information to a feedback receiving terminal that sends a corresponding feedback adjustment instruction; or sending, in a second time slot over the adjusted designated frequency, corresponding feedback information to a feedback receiving terminal that sends a corresponding feedback adjustment instruction.

According to another aspect of the present disclosure, a device for data feedback processing is provided, where the device is applied to a first terminal, and the device includes: a feedback determining module, which determines, upon determining that feedback is required to be provided, in a first time slot, for first data sent by a plurality of second terminals, the plurality of second terminals as feedback receiving terminals; a simultaneous feedback judgment module, which determines whether the first terminal supports simultaneous feedback; and a first information feedback module, which respectively sends, based on a plurality of consecutive feedback resources, in the first time slot over a designated frequency upon determining that the first terminal supports simultaneous feedback, corresponding feedback information to the plurality of feedback receiving terminals, where the feedback information is used to indicate a receiving status of the first terminal for the first data.

For the foregoing device, in a possible implementation, the simultaneous feedback judgment module includes: a judgment submodule, which determines, according to at least one of a transmission power supported by the first terminal, a distribution status of feedback resources obtained, feedback information that is required to be sent, and a feedback transmission power required to transmit the feedback information, whether the first terminal supports simultaneous feedback.

For the foregoing device, in a possible implementation, the device includes: a transmission power determining module, which determines, upon determining that the first terminal does not support simultaneous feedback, according to path losses of sidelinks between the first terminal and the feedback receiving terminals, a feedback transmission power for sending the feedback information to the feedback receiving terminals; a target terminal determining module, which determines whether the first terminal can send, at the feedback transmission power, the feedback information to the feedback receiving terminals, and determines, as a target terminal, a feedback receiving terminal that enables the first terminal to perform feedback information transmission at the feedback transmission power; and a second information feedback module, which sends, in a case of one target terminal, in the first time slot over the designated frequency, the feedback information to the target terminal.

For the foregoing device, in a possible implementation, the device includes: a priority level determining module, which selects, in a case of more than one target terminal, from a plurality of target terminals according to the service priority level, the target terminal having the highest service priority level; and a third information feedback module, which sends, in the first time slot over the designated frequency, the feedback information to the target terminal having the highest service priority level.

For the foregoing device, in a possible implementation, the device includes: an adjustment request sending module, which sends, upon determining that the first terminal does not support simultaneous feedback, a feedback adjustment request to at least one of the plurality of feedback receiving terminals, where the feedback adjustment request includes at least one of an adjustment to feedback interval information, an adjustment to reception time information about reception of the first data, and an adjustment to a designated frequency; an adjustment instruction receiving module, which receives a feedback adjustment instruction sent by the feedback receiving terminal in response to the feedback adjustment request, where the feedback adjustment instruction includes at least one of adjusted feedback interval information, adjusted reception time information, and an adjusted designated frequency; and a fourth information feedback module, which respectively sends, according to the feedback adjustment instruction, the corresponding feedback information to the plurality of feedback receiving terminals.

For the foregoing device, in a possible implementation, the fourth information feedback module includes at least one of the following submodules: a first sending submodule, which sends, in a second time slot over the adjusted designated frequency, corresponding feedback information to a feedback receiving terminal that sends a corresponding feedback adjustment instruction; a second sending submodule, which sends, in a second time slot over the designated frequency, corresponding feedback information to a feedback receiving terminal that sends a corresponding feedback adjustment instruction; or a third sending submodule, which sends, in a second time slot over the adjusted designated frequency, corresponding feedback information to a feedback receiving terminal that sends a corresponding feedback adjustment instruction.

According to another aspect of the present disclosure, a device for data feedback processing is provided, including: a processor; and a memory for storing an instruction executable by the processor, where the processor is configured to perform the foregoing method for data feedback processing.

According to another aspect of the present disclosure, a non-transitory computer-readable storage medium storing a computer program instruction is provided, where when the computer program instruction is executed by a processor, the foregoing method for data feedback processing is implemented.

According to the method and the device provided in the embodiments of the present disclosure, the method is applied to a first terminal and includes: upon determining that feedback is required to be provided, in a first time slot, for first data sent by a plurality of second terminals, determining the plurality of second terminals as feedback receiving terminals; determining whether the first terminal supports simultaneous feedback; and respectively sending, based on a plurality of consecutive feedback resources, in the first time slot over a designated frequency upon determining that the first terminal supports simultaneous feedback, corresponding feedback information to the plurality of feedback receiving terminals, where the feedback information is used to indicate a receiving status of the first terminal for the first data.

In view of this, the present disclosure proposes another method and a device for data feedback processing, so as to adapt to requirements for simultaneous information feedback for a plurality of pieces of received first data in the same time slot in various scenarios of V2X.

According to an aspect of the present disclosure, a method for data feedback processing is provided, where the method is applied to a first terminal, and the method includes: upon determining that feedback is required to be provided, in a first time slot, for first data sent by a plurality of second terminals, determining the plurality of second terminals as feedback receiving terminals; determining whether the first terminal supports simultaneous feedback; and determining, according to a service priority level upon determining that the first terminal does not support simultaneous feedback, a target terminal having the highest service priority level from the plurality of feedback receiving terminals, and sending, in the first time slot, feedback information to the target terminal having the highest service priority level, where the feedback information is used to indicate a receiving status of the first terminal for the first data.

In a possible implementation, the service priority level includes a first data priority level and/or a second terminal priority level.

In a possible implementation, the method includes: respectively sending, in the first time slot upon determining that the first terminal supports simultaneous feedback, corresponding feedback information to the plurality of feedback receiving terminals.

In a possible implementation, the respectively sending, in the first time slot upon determining that the first terminal supports simultaneous feedback, corresponding feedback information to the plurality of feedback receiving terminals includes: respectively sending, based on a plurality of consecutive feedback resources, in the first time slot upon determining that the first terminal supports simultaneous feedback, corresponding feedback information to the plurality of feedback receiving terminals.

In a possible implementation, the determining whether the first terminal supports simultaneous feedback includes: determining, according to at least one of a transmission power supported by the first terminal, a distribution status of feedback resources obtained, feedback information that is required to be sent, and a feedback transmission power required to transmit the feedback information, whether the first terminal supports simultaneous feedback.

In a possible implementation, the determining, according to a service priority level upon determining that the first terminal does not support simultaneous feedback, a target terminal having the highest service priority level from the plurality of feedback receiving terminals, and sending, in the first time slot, feedback information to the target terminal having the highest service priority level includes: upon determining that the first terminal does not support simultaneous feedback, determining, according to path losses of sidelinks between the first terminal and the feedback receiving terminals, a feedback transmission power for sending the feedback information to the feedback receiving terminals; determining whether the first terminal can send, at the feedback transmission power, the feedback information to the feedback receiving terminals, and determining, as a target terminal, a feedback receiving terminal that enables the first terminal to perform feedback information transmission at the feedback transmission power; in a case of more than one target terminal, selecting the target terminal having the highest service priority level from a plurality of target terminals according to the service priority level; and sending, in the first time slot, the feedback information to the target terminal having the highest service priority level.

In a possible implementation, the method includes: upon determining that the first terminal does not support simultaneous feedback, sending a feedback adjustment request to at least one of the plurality of feedback receiving terminals, where the feedback adjustment request includes at least one of an adjustment to feedback interval information, an adjustment to reception time information about reception of the first data, and an adjustment to a designated frequency; receiving a feedback adjustment instruction sent by the feedback receiving terminal in response to the feedback adjustment request, where the feedback adjustment instruction includes at least one of adjusted feedback interval information, adjusted reception time information, and an adjusted designated frequency; and respectively sending, according to the feedback adjustment instruction, the corresponding feedback information to the plurality of feedback receiving terminals.

In a possible implementation, the respectively sending, according to the feedback adjustment instruction, the corresponding feedback information to the plurality of feedback receiving terminals includes at least one of the following: sending, in a second time slot over the adjusted designated frequency, corresponding feedback information to a feedback receiving terminal that sends a corresponding feedback adjustment instruction; sending, in a second time slot over the designated frequency, corresponding feedback information to a feedback receiving terminal that sends a corresponding feedback adjustment instruction; or sending, in a second time slot over the adjusted designated frequency, corresponding feedback information to a feedback receiving terminal that sends a corresponding feedback adjustment instruction.

According to another aspect of the present disclosure, a device for data feedback processing is provided, where the device is applied to a first terminal, and the device includes: a feedback determining module, which determines, upon determining that feedback is required to be provided, in a first time slot, for first data sent by a plurality of second terminals, the plurality of second terminals as feedback receiving terminals; a simultaneous feedback judgment module, which determines whether the first terminal supports simultaneous feedback; and a first feedback module, which determines, according to a service priority level upon determining that the first terminal does not support simultaneous feedback, a target terminal having the highest service priority level from the plurality of feedback receiving terminals, and sends, in the first time slot, feedback information to the target terminal having the highest service priority level, where the feedback information is used to indicate a receiving status of the first terminal for the first data.

In a possible implementation, the service priority level includes a first data priority level and/or a second terminal priority level.

In a possible implementation, the device includes: a second feedback module, which respectively sends, in the first time slot upon determining that the first terminal supports simultaneous feedback, corresponding feedback information to the plurality of feedback receiving terminals.

In a possible implementation, the second feedback module is configured to respectively send, based on a plurality of consecutive feedback resources, in the first time slot upon determining that the first terminal supports simultaneous feedback, corresponding feedback information to the plurality of feedback receiving terminals.

In a possible implementation, the simultaneous feedback judgment module includes: a judgment submodule, which determines, according to at least one of a transmission power supported by the first terminal, a distribution status of feedback resources obtained, feedback information that is required to be sent, and a feedback transmission power required to transmit the feedback information, whether the first terminal supports simultaneous feedback.

In a possible implementation, the first feedback module is configured to: upon determining that the first terminal does not support simultaneous feedback, determine, according to path losses of sidelinks between the first terminal and the feedback receiving terminals, a feedback transmission power for sending the feedback information to the feedback receiving terminals; determine whether the first terminal can send, at the feedback transmission power, the feedback information to the feedback receiving terminals, and determine, as a target terminal, a feedback receiving terminal that enables the first terminal to perform feedback information transmission at the feedback transmission power; in a case of more than one target terminal, select the target terminal having the highest service priority level from a plurality of target terminals according to the service priority level; and send, in the first time slot, the feedback information to the target terminal having the highest service priority level.

In a possible implementation, the device includes: an adjustment request sending module, which sends, upon determining that the first terminal does not support simultaneous feedback, a feedback adjustment request to at least one of the plurality of feedback receiving terminals, where the feedback adjustment request includes at least one of an adjustment to feedback interval information, an adjustment to reception time information about reception of the first data, and an adjustment to a designated frequency; an adjustment instruction receiving module, which receives a feedback adjustment instruction sent by the feedback receiving terminal in response to the feedback adjustment request, where the feedback adjustment instruction includes at least one of adjusted feedback interval information, adjusted reception time information, and an adjusted designated frequency; and a fourth feedback module, which respectively sends, according to the feedback adjustment instruction, the corresponding feedback information to the plurality of feedback receiving terminals.

In a possible implementation, the fourth feedback module includes at least one of the following submodules: a first sending submodule, which sends, in a second time slot over the adjusted designated frequency, corresponding feedback information to a feedback receiving terminal that sends a corresponding feedback adjustment instruction; a second sending submodule, which sends, in a second time slot over the designated frequency, corresponding feedback information to a feedback receiving terminal that sends a corresponding feedback adjustment instruction; or a third sending submodule, which sends, in a second time slot over the adjusted designated frequency, corresponding feedback information to a feedback receiving terminal that sends a corresponding feedback adjustment instruction.

According to another aspect of the present disclosure, a device for data feedback processing is provided, including: a processor; and a memory for storing an instruction executable by the processor, where the processor is configured to perform the foregoing method for data feedback processing.

According to another aspect of the present disclosure, a non-transitory computer-readable storage medium storing computer program instructions are provided, where when the computer program instructions are executed by a processor, the foregoing method for data feedback processing is implemented.

According to the method and the device for data feedback processing provided in the embodiments of the present disclosure, the method is applied to a first terminal and includes: upon determining that feedback is required to be provided, in a first time slot, for first data sent by a plurality of second terminals, determining the plurality of second terminals as feedback receiving terminals; determining whether the first terminal supports simultaneous feedback; and determining, according to a service priority level upon determining that the first terminal does not support simultaneous feedback, a target terminal having the highest service priority level from the plurality of feedback receiving terminals, and sending, in the first time slot, feedback information to the target terminal having the highest service priority level, where the feedback information is used to indicate a receiving status of the first terminal for the first data.

According to the following detailed description of exemplary embodiments with reference to the accompanying drawings, other features and aspects of the present disclosure will become clear.

BRIEF DESCRIPTION OF THE DRAWINGS

The accompanying drawings included in the specification and constituting a part of the specification, together with the specification, illustrate exemplary embodiments, features, and aspects of the present disclosure, and are used to explain the principle of the present disclosure.

DETAILED DESCRIPTION

Figure 1:
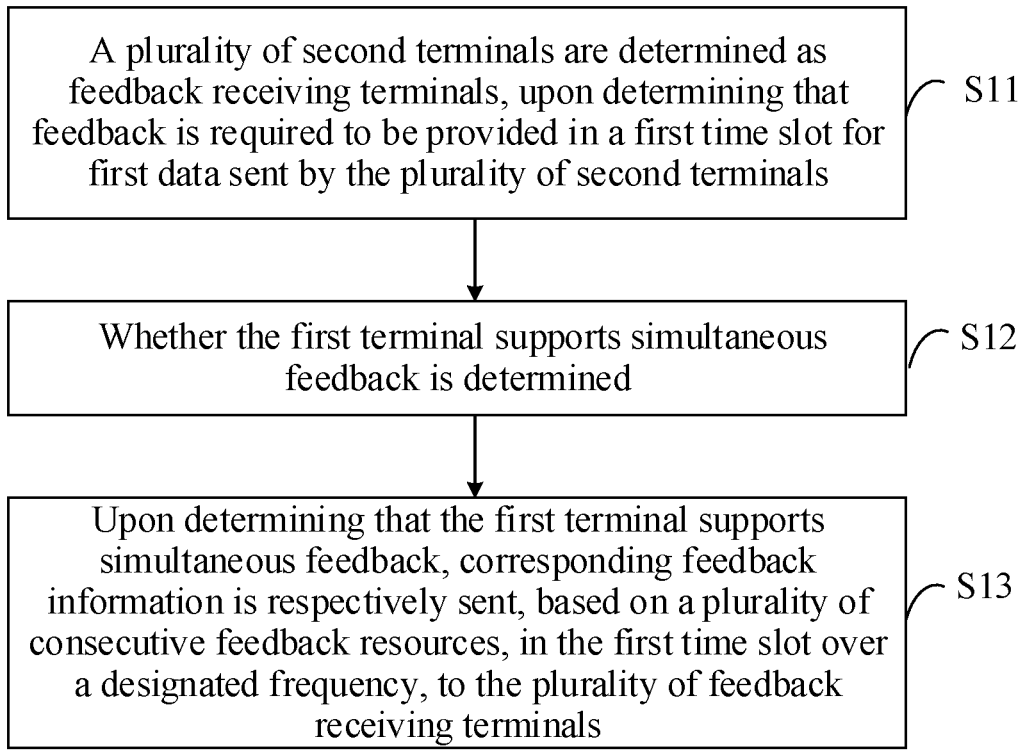
FIG. 1 is a flowchart of a method for data feedback processing according to an embodiment of the present disclosure.

Various exemplary embodiments, features, and aspects of the present disclosure will be described in detail below with reference to the drawings. The same reference numerals in the drawings indicate elements with the same or similar functions. Although various aspects of the embodiments are shown in the drawings, unless otherwise noted, the drawings are not necessarily drawn to scale.

The word "exemplary" herein means "serving as an example, embodiment, or illustration". Any embodiment described herein as "exemplary" shall not be construed as being superior to or better than other embodiments.

In addition, to better illustrate the present disclosure, numerous specific details are given in the following specific implementations. Persons skilled in the art should understand that the present disclosure can also be implemented without certain specific details. In some embodiments, the methods, means, elements, and circuits well-known to persons skilled in the art are not described in details, so that the subject matters of the present disclosure can be highlighted.

FIG. 1 is a flowchart of a method for data feedback processing according to an embodiment of the present disclosure. As shown in FIG. 1, the method may be applied to a first terminal, and the method includes steps S11 to S13.

In S11, a plurality of second terminals are determined as feedback receiving terminals, upon determining that feedback is required to be provided in a first time slot for first data sent by the plurality of second terminals.

In S12, whether the first terminal supports simultaneous feedback is determined.

In S13, upon determining that the first terminal supports simultaneous feedback, corresponding feedback information is respectively sent, based on a plurality of consecutive feedback resources, in the first time slot over a designated frequency, to the plurality of feedback receiving terminals, where the feedback information is used to indicate a receiving status of the first terminal for the first data.

In this embodiment, data transmission can be performed between the plurality of second terminals and the first terminal. The first terminal may determine a time slot for information feedback for the first data according to reception time information about reception of the first data and corresponding feedback interval information.

In this embodiment, the first terminal and the second terminals may be terminal devices that can be used in V2X, such as vehicles, handheld terminals, mobile phones, tablets, personal computers, etc., in V2X, and both of them may be referred to as user equipment, UE for short. The first terminal and the second terminals can communicate directly with each other for data transmission. For example, a PC5 interface is used for direct communication.

In this embodiment, the first terminal may determine the feedback interval information according to control signaling corresponding to the first data. Alternatively, the first terminal may determine the feedback interval information according to a configuration negotiated before data transmission between the first terminal and the second terminals. Alternatively, the first terminal may determine the feedback interval information according to a protocol for data transmission, etc. Persons skilled in the art may set a manner of determining the feedback interval information according to actual needs, which is not limited in the present disclosure. The control signaling may be signaling corresponding to the first data and sent by the second terminals in a same time slot, and the control signaling may be sent simultaneously with the first data, or may be sent before the first data, which is not limited in the present disclosure.

In this embodiment, the feedback interval information is used to indicate a time interval between a time point when the first terminal receives the first data and a time point when the first terminal sends feedback information corresponding to the first data. The feedback interval information may be a time interval (represented by the number of symbols) between the first terminal receiving the last symbol of the first data and sending the feedback information, or may be a time slot interval between the first terminal receiving the last symbol of the first data and sending the feedback information, where the time slot interval may be represented by the number of time slots in the interval. A time slot is a unit of time for information transmission, and generally, one time slot contains 14 symbols in length.

In this embodiment, when the first terminal receives the first data from the plurality of second terminals in the same time slot, if the plurality of second terminals set the same feedback time interval, there will be a scenario of simultaneous feedback, and the plurality of second terminals may be determined as feedback receiving terminals. Alternatively, when the plurality of second terminals send the first data to the first terminal in different time slots, but the plurality of second terminals set different feedback time intervals, there will also be a scenario of simultaneous feedback, and the plurality of second terminals may be determined as feedback receiving terminals.

In this embodiment, the first data may be various types of data that requires feedback information sent by the first terminal after reception of the first data, and each second terminal may send the first data to the first terminal. The first data sent by different second terminals to the first terminal may be the same or different, and usually different. Persons skilled in the art may set the first data according to actual needs, which is not limited in the present disclosure. The feedback information may be an ACK (Acknowledgment) or a NACK (Negative Acknowledgment), where the ACK is used to indicate that the first terminal has successfully received the first data sent by the second terminal, and the NACK is used to indicate that the first terminal has not successfully received or has not successfully parsed the first data sent by the second terminal. The feedback information may include other information, such as identification information of a feedback receiving terminal and identification information of the first terminal, so that a feedback receiving terminal that receives the feedback information can clearly know whether the feedback information is feedback information required by the terminal.

In this embodiment, the control signaling may be signaling corresponding to the first data and sent by the plurality of second terminals in a same time slot, and the control signaling may be sent simultaneously with the first data, or may be sent before the first data, which is not limited in the present disclosure. The control signaling may be sidelink control signaling (Sidelink Control Information, SCI) or PC5 RRC (Radio Resource Control) signaling, and the control signaling may include information about whether or not to retransmit, modulation and coding strategies for the first data and/or the feedback information, information about physical resource blocks occupied by the first data, and other information associated with transmission of the first data.

In this embodiment, the feedback resource may be a physical resource block in frequency domain. Consecutive feedback resources may be physical resources that are consecutive in frequency domain, that is, numbers of the physical resources are consecutive. The designated frequency may be a frequency for receiving the first data, or a frequency for sending the feedback information that is agreed in advance with the second terminal that send the first data. For example, a plurality of second terminals send the first data to the first terminal on a frequency F1, and the first terminal sends the feedback information to a plurality of second terminals on the frequency F1.

In this embodiment, the second terminals may send the first data to the first terminal over sidelinks with the first terminal. The first terminal may send corresponding feedback information over sidelinks with the plurality of feedback receiving terminals, which can improve the accuracy of data transmission and reduce interference to other terminals.

In a possible implementation, S13 of determining whether the first terminal supports simultaneous feedback may include: determining, according to at least one of a transmission power supported by the first terminal, a distribution status of feedback resources obtained, feedback information that is required to be sent, and a feedback transmission power required to transmit the feedback information, whether the first terminal supports simultaneous feedback.

In this implementation, whether the first terminal supports simultaneous feedback may be determined according to data related to the feedback information, such as whether the first terminal can obtain consecutive feedback resources, the number of consecutive feedback resources, the number of pieces of feedback information that is required to be sent, and a feedback transmission power for the feedback information that is required to be transmitted, and a transmission power supported by the first terminal itself. Herein, whether the first terminal can obtain consecutive feedback resources and the number of consecutive feedback resources are the above-mentioned distribution status of feedback resources obtained. Generally, due to hardware limitations, the first terminal cannot send, on one frequency, signals that are not consecutive in frequency domain. If a feedback resource is determined by the first terminal, and the first terminal can obtain consecutive feedback resources, the first terminal can determine, according to the transmission power supported by the first terminal itself, the number of pieces of feedback information that is required to be transmitted, and the feedback transmission power required to transmit the feedback information, whether the first terminal supports simultaneous feedback. For example, if it is determined that there are two feedback receiving terminals, and the first terminal determines that the first terminal can send feedback information to a maximum of two terminals in one time slot on consecutive feedback resources, and that a transmission power supported by the first terminal is greater than or equal to the feedback transmission power, and it can be determined that the first terminal supports simultaneous feedback.

In this implementation, the transmission power supported by the first terminal may include a maximum transmit power of the first terminal on the designated frequency and a maximum transmission power that can be transmitted by the first terminal in a cell where the first terminal is in. The first terminal may determine the maximum transmit power on the designated frequency according to a protocol for data transmission and a hardware status of components of the first terminal. When the first terminal is within the coverage of a certain cell, a maximum transmission power that can be transmitted by the first terminal in an uplink in the cell can be determined according to a path loss (Uu PL) of the cell that is measured by the first terminal and a receive power expected by a base station. The maximum transmission power may be represented by the sum of the receive power expected by the base station and the path loss of the cell. The feedback transmission power being less than or equal to the transmission power supported by the first terminal may be that the feedback transmission power is less than or equal to the maximum transmit power of the first terminal on the designated frequency, and/or less than or equal to the maximum transmission power that can be transmitted by the cell where the first terminal is in.

Herein, when the feedback transmission power is less than or equal to the transmission power supported by the first terminal, and the number of consecutive feedback resources is greater than or equal to the number of feedback receiving terminals (or the number of consecutive feedback resources is greater than or equal to the number of pieces of feedback information that is required to be transmitted), it can be determined that the first terminal supports simultaneous feedback. When the transmission power supported by the first terminal is less than the feedback transmission power, or the first terminal cannot obtain consecutive feedback resources, or the number of consecutive feedback resources is less than the number of feedback receiving terminals, or the number of consecutive feedback resources is less than the number of pieces of feedback information that is required to be transmitted, it can be determined that the first terminal does not support simultaneous feedback.

In this implementation, the first terminal may determine in advance whether the first terminal supports simultaneous feedback, and store the information as basic information of the first terminal, so that when receiving the first data, the first terminal can directly determine, according to the content stored, whether the first terminal supports simultaneous feedback.

It should be understood that persons skilled in the art can set, according to actual needs, a manner of determining whether the first terminal supports simultaneous feedback, which is not limited in the present disclosure.

In a possible implementation, the method includes: upon determining that the first terminal does not support simultaneous feedback, determining, according to path losses (SL Pathloss) of sidelinks between the first terminal and the feedback receiving terminals, a feedback transmission power for sending the feedback information to the feedback receiving terminals; determining whether the first terminal can send, at the feedback transmission power, the feedback information to the feedback receiving terminals, and determining, as a target terminal, a feedback receiving terminal that enables the first terminal to perform feedback information transmission at the feedback transmission power; and in a case of one target terminal, sending, in the first time slot over the designated frequency, the feedback information to the target terminal.

Herein, a path loss of a sidelink between the first terminal and a feedback receiving terminal is affected by a distance between the two terminals, external signal interference, obstructions, and other factors that affect data transmission of the sidelink. Due to different positions of different feedback receiving terminals, relative distances between different feedback receiving terminals and the first terminal are different, and therefore the path losses of the sidelinks may also be different. The longer the relative distance between the feedback receiving terminal and the first terminal, the higher the path loss of the sidelink. The calculation of a path loss is the prior art, and a difference between a power of a transmitted signal and a power of a received signal is the path loss.

Herein, the first terminal may determine the feedback transmission power by using a power compensation mechanism similar to that in LTE. In other words, the first terminal may use a received signal power expected by a feedback receiving terminal plus a path loss compensation caused by a path loss of a sidelink between the first terminal and the feedback receiving terminal as a feedback transmission power for the first terminal to send feedback information to the feedback receiving terminal. The path loss compensation caused by the path loss of the sidelink between the first terminal and the feedback receiving terminal can be determined according to the path loss of the sidelink between the first terminal and the feedback receiving terminal, a corresponding compensation scale factor, and other path loss compensation related parameters. For the path loss compensation, the compensation scale factor may be set to, for example, 0.5 or 0.9. The received signal powers expected by different feedback receiving terminals may be the same or different. If the received signal powers expected by different feedback receiving terminals are the same, when the first terminal sends feedback information, feedback transmission powers determined by the first terminal for different feedback receiving terminals may be different due to different relative distances between the feedback receiving terminals and the first terminal. If the received signal powers expected by different feedback receiving terminals are different, when the first terminal sends feedback information, feedback transmission powers determined by the first terminal for different feedback receiving terminals may be the same or different due to different relative distances between the feedback receiving terminals and the first terminal.

In this implementation, both the first terminal and the feedback receiving terminal can determine the path loss of the sidelink according to reference signals sent by the two in advance. For example, the first terminal may determine, according to a transmitted power of a reference signal sent by the feedback receiving terminal and a received power of a received reference signal, the path loss of the sidelink between the first terminal and the feedback receiving terminal.

In this implementation, after the first terminal determines the feedback transmission power for sending the feedback information to the feedback receiving terminals, whether signal transmission can be performed at the feedback transmission power may be determined according to the transmission power supported by the first terminal. When the first terminal determines whether the first terminal can send the feedback information to the feedback receiving terminals at the feedback transmission power, when the first terminal is within the coverage of a cell, if the determined feedback transmission power is less than or equal to the maximum transmit power of the first terminal on the designated frequency and is less than or equal to the maximum transmission power that can be transmitted by the first terminal in the cell where the first terminal is in, the first terminal can determine that the first terminal can send the feedback information to the feedback receiving terminals at the feedback transmission power; otherwise, it is determined that the first terminal cannot send the feedback information to the feedback receiving terminals at the feedback transmission power. If the first terminal is not within the coverage of a cell (that is, not within the coverage of all cells), the first terminal determines, only according to the determined feedback transmission power being less than or equal to the maximum transmit power of the first terminal on the designated frequency, that the first terminal can send the feedback information to the feedback receiving terminals at the feedback transmission power. In mobile communications, an area covered by a wireless signal is referred to as a cell, and the coverage of a cell may be a range or part of the range that can be covered by a signal of a base station. One base station may govern one or more cells, and each cell may have its separate coverage area.

It should be understood that the above manner of determining the feedback transmission power is merely an exemplary manner provided in this embodiment of the present disclosure. Persons skilled in the art may set, according to actual needs, a more detailed manner of determining the feedback transmission power by making a compensation based on the path loss, such that the setting includes other parameters, for example, considering the impact of the number of data blocks to be transmitted and a modulation and coding format, and terms that reflect the number of data blocks to be transmitted and the modulation and coding format may be added to an expression for determining the transmission power, which is not limited in the present disclosure.

In a possible implementation, the method includes: in a case of more than one target terminal, selecting, from a plurality of target terminals according to a service priority level, a target terminal having the highest service priority level; and sending, in the first time slot over the designated frequency, the feedback information to the target terminal having the highest service priority level.

In this implementation, the service priority level may include information such as a data priority level and/or a terminal priority level that can indicate a priority level of information feedback for the first data. Herein, the data priority level may be a priority level of the received first data, and priority levels of different types of first data may be the same or different. The terminal priority level may be a priority level corresponding to a terminal, and priority levels corresponding to different users of different types of terminals may be the same or different. The data priority level and the terminal priority level may be weighted and summed to obtain the service priority level. Persons skilled in the art may set a manner for determining the service priority level according to actual needs, which is not limited in the present disclosure.

In this implementation, if there is more than one target terminal having the highest service priority level, the feedback information may be sent to any one of the target terminals; or the feedback information may be sent to a target terminal with a low feedback transmission power; or the feedback information may be sent to a target terminal that first sends the first data.

If there is no target terminal, the first terminal may send the feedback information to any one of the target terminals; or the feedback information may be sent to a target terminal with a low feedback transmission power; or the feedback information may be sent to a target terminal that first sends the first data, which is not limited in the present disclosure.

In a possible implementation, the method includes: upon determining that the first terminal does not support simultaneous feedback, sending a feedback adjustment request to at least one of the plurality of feedback receiving terminals, where the feedback adjustment request may include at least one of an adjustment to feedback interval information, an adjustment to reception time information about reception of the first data, and an adjustment to a designated frequency; receiving a feedback adjustment instruction sent by the feedback receiving terminal in response to the feedback adjustment request, where the feedback adjustment instruction includes at least one of adjusted feedback interval information, adjusted reception time information, and an adjusted designated frequency; and respectively sending, according to the feedback adjustment instruction, the corresponding feedback information to the plurality of feedback receiving terminals.

In this implementation, the feedback adjustment request may include an adjustment type requested by the first terminal for adjustment. For example, the adjustment type may include an adjustment to the feedback interval information, an adjustment to the reception time information, and an adjustment to the designated frequency. After receiving the feedback adjustment request, the second terminals may determine, according to the feedback adjustment request, the adjustment type requested by the first terminal, and then adjust at least one of the feedback interval information, the reception time information, and the designated frequency according to the adjustment type, to generate the feedback adjustment instruction. The feedback adjustment instruction includes at least one of adjusted feedback interval information, adjusted reception time information, and an adjusted designated frequency that are configured by the second terminals.

In this implementation, the feedback adjustment request may include different types of adjustments and adjusted information corresponding to the types. The adjustment to the feedback interval information may include at least one piece of adjusted feedback interval information (that is, adjusted information) to be selected that is configured by the first terminal. The adjustment to the reception time information may include at least one piece of adjusted reception time information (that is, adjusted information) to be selected that is configured by the first terminal, and the second terminals may determine, according to transmission time of the first data and receiving time of receiving the first data by the first terminal, sending time of sending the first data to the first terminal. The adjustment to the designated frequency may include at least one adjusted designated frequency (that is, adjusted information) to be selected that is configured by the first terminal. After receiving the feedback adjustment request, the second terminals may determine, according to the feedback adjustment request, the adjustment type requested by the first terminal and the adjusted information, and then adjust at least one of the feedback interval information, the reception time information, and the designated frequency according to the adjustment type, to generate the feedback adjustment instruction. The feedback adjustment instruction includes at least one of adjusted feedback interval information, adjusted reception time information, and an adjusted designated frequency that are selected by the second terminals from the adjusted information to be selected that is provided by the first terminal.

In this implementation, upon determining that the first terminal does not support simultaneous feedback, the feedback information may be sent to one of the feedback receiving terminals, and the feedback adjustment request may be sent to the remaining at least one feedback receiving terminal. In a case of one target terminal, the feedback information may be sent to the target terminal, or the feedback information may be sent to the target terminal having the highest service priority level, or the feedback information may be sent to one terminal randomly selected from the plurality of feedback receiving terminals, which is not limited in the present disclosure.

In the foregoing manner, it can be ensured that each of the plurality of feedback receiving terminals can receive corresponding feedback information.

In a possible implementation, the respectively sending, according to the feedback adjustment instruction, the corresponding feedback information to the plurality of feedback receiving terminals may include at least one of the following: sending, in a second time slot over the adjusted designated frequency, corresponding feedback information to a feedback receiving terminal that sends a corresponding feedback adjustment instruction; sending, in a second time slot over the designated frequency, corresponding feedback information to a feedback receiving terminal that sends a corresponding feedback adjustment instruction; or sending, in a second time slot over the adjusted designated frequency, corresponding feedback information to a feedback receiving terminal that sends a corresponding feedback adjustment instruction.

When the feedback adjustment instruction includes the adjusted designated frequency, the first terminal may send, in the second time slot according to the adjusted designated frequency, the corresponding feedback information to the feedback receiving terminal that sends the feedback adjustment instruction (including the adjusted designated frequency). Herein, the second time slot may be determined according to feedback interval information after the first terminal receives the feedback adjustment instruction and receives the first data sent by the second terminal, and the second time slot is different from the first time slot.

When the feedback adjustment instruction includes the adjusted feedback interval information, after receiving the feedback adjustment instruction, the first terminal may determine, according to time when the first data is received and the adjusted feedback interval information, the second time slot for sending the feedback information to the feedback receiving terminal. Then, the first terminal may send, in the second time slot according to the designated frequency, the corresponding feedback information to the feedback receiving terminal that sends the feedback adjustment instruction (including the adjusted feedback interval information).

When the feedback adjustment instruction includes the adjusted reception time information, after receiving the feedback adjustment instruction, the first terminal may determine, according to the adjusted reception time information and the feedback interval information, the second time slot for sending the feedback information to the feedback receiving terminal. Then, the first terminal may send, in the second time slot according to the designated frequency, the corresponding feedback information to the feedback receiving terminal that sends the feedback adjustment instruction (including the adjusted reception time information).

When the feedback adjustment instruction includes the adjusted designated frequency and the adjusted feedback interval information, after receiving the feedback adjustment instruction, the first terminal may determine, according to time when the first data is received and the adjusted feedback interval information, the second time slot for sending the feedback information to the feedback receiving terminal. Then, the first terminal may send, in the second time slot according to the adjusted designated frequency, the corresponding feedback information to the feedback receiving terminal that sends the feedback adjustment instruction (including the adjusted designated frequency and the adjusted feedback interval information).

When the feedback adjustment instruction includes the adjusted designated frequency and the adjusted reception time information, after receiving the feedback adjustment instruction, the first terminal may determine, according to the adjusted reception time information and the feedback interval information, the second time slot for sending the feedback information to the feedback receiving terminal. Then, the first terminal may send, in the second time slot according to the adjusted designated frequency, the corresponding feedback information to the feedback receiving terminal that sends the feedback adjustment instruction (including the adjusted designated frequency and the adjusted reception time information).

The feedback adjustment instruction may be included by the second terminals in sidelink control signaling, and is indicated to the first terminal.

It should be noted that although the foregoing embodiment is taken as an example to describe the method for data feedback processing as above, persons skilled in the art can understand that the present disclosure should not be limited thereto. In fact, a user can flexibly set the steps completely according to personal preferences and/or actual application scenarios, as long as the steps conform to the technical solution of the present disclosure.

According to the method for data feedback processing provided in this embodiment of the present disclosure, in various scenarios of V2X, upon determining that the first terminal is required to provide simultaneous feedback for a plurality of pieces of first data in the first time slot, the first terminal can quickly formulate a corresponding feedback manner, so as to ensure that the feedback information can be received.

Application Example

In the following, an application example of the embodiments of the present disclosure is given with reference to an exemplary application scenario of "a user sending first data via UE 1 and UE 2", so as to facilitate understanding of procedures of the method for data feedback processing. Persons skilled in the art should understand that the following application example is merely for the purpose of facilitating illustration of the embodiments of the present disclosure, and shall not be considered as a limitation to the embodiments of the present disclosure.

Figure 2:
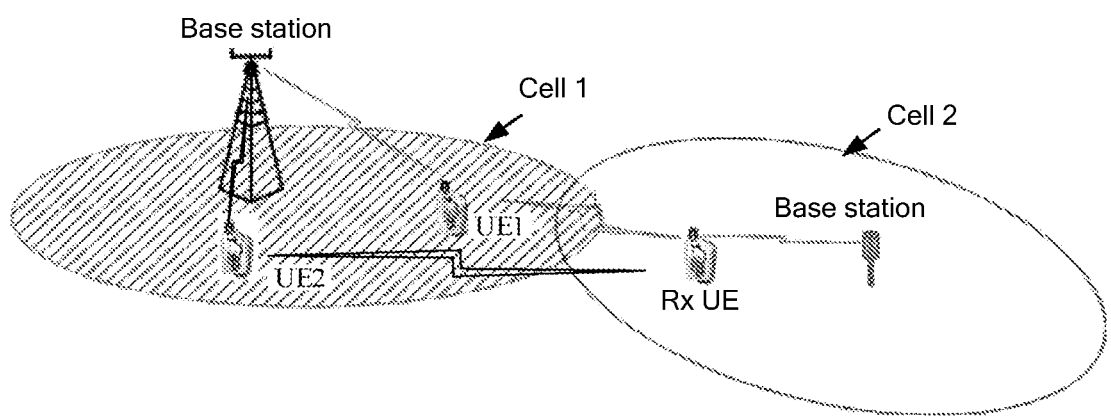
FIG. 2 is a schematic diagram of an application scenario of a method for data feedback processing according to an embodiment of the present disclosure.

FIG. 2 is a schematic diagram of an application scenario of a method for data feedback processing according to an embodiment of the present disclosure. As shown in FIG. 2, it is assumed that UE 1 and UE 2 (that is, second terminals) send first data to Rx UE (that is, a first terminal). The UE 1 and the UE 2 are in a cell 1, the Rx UE is in a cell 2, and the cell 1 and the cell 2 are adjacent to each other.

The UE 1 and the UE 2 send the first data to the Rx UE. After the Rx UE receives the first data sent by the UE 1 and the UE 2, the Rx UE determines that the Rx UE is required to send feedback information to the UE 1 and the UE 2 simultaneously in a first time slot. Both the UE 1 and the UE 2 send the first data over the designated frequency f1.

Scenario 1

If it is determined that the Rx UE supports simultaneous feedback, feedback information may be sent to the UE 1 and the UE 2 respectively by using consecutive feedback resources in the first time slot over the designated frequency f1.

Scenario 2

If it is determined that the Rx UE does not support simultaneous feedback, feedback transmission powers at which the Rx UE sends feedback information to the UE 1 and the UE 2 are determined. It is assumed that a feedback transmission power of the UE 1 is P1 and a feedback transmission power of the UE 2 is P2. In addition, whether the Rx UE can send the feedback information to the UE 1 and the UE 2 at P1 and P2 respectively is determined.

In a first case, assuming that the Rx UE can send the feedback information to the UE 2 at P2, but cannot send the feedback information to the UE 1 at P1 (corresponding to a scenario of P2<P1), the Rx UE sends the feedback information to the UE 2 in the first time slot over the designated frequency f1. Assuming that the Rx UE can send the feedback information to the UE 1 at P1, but cannot send the feedback information to the UE 2 at P2 (corresponding to a scenario of P1<P2), the Rx UE sends the feedback information to the UE 1 in the first time slot over the designated frequency f1.

In a second case, assuming that the Rx UE can send the feedback information to the UE 2 at P2 and can send the feedback information to the UE 1 at P1, because the Rx UE does not support simultaneous feedback, the Rx UE continues to determine service priority levels of the UE 1 and the UE 2. When a service priority level of the UE 2 is higher than a service priority level of the UE 1, the Rx UE may send the feedback information to the UE 2 in the first time slot over the designated frequency f1. When a service priority level of the UE 1 is higher than a task priority level of the UE 2, the Rx UE may send the feedback information to the UE 1 in the first time slot over the designated frequency f1.

In the first case and the second case described above, for the UE 1 or the UE 2 to which the feedback information has not been sent in the first time slot over the designated frequency f1, a subsequent processing process is as follows. For ease of description, an example in which the Rx UE does not send the feedback information to the UE 1 is used below for description. If the Rx UE does not send the feedback information to the UE 1, a processing process is similar to the following process, and details will not be further described.

The Rx UE may send a feedback adjustment request to the UE 1. The feedback adjustment request may include at least one of an adjustment to feedback interval information, an adjustment to reception time information about reception of the first data, and an adjustment to a designated frequency. The Rx UE receives a feedback adjustment instruction returned by the UE 1, where the feedback adjustment instruction includes at least one of adjusted feedback interval information, adjusted reception time information, and an adjusted designated frequency.

Herein, when the feedback adjustment instruction of the UE 1 includes an adjusted designated frequency f2, after receiving the feedback adjustment instruction, the Rx UE may determine a second time slot according to time when new first data is received and the feedback interval information, and the Rx UE may send corresponding feedback information to the UE 1 in the second time slot according to the adjusted designated frequency f2.

When the feedback adjustment instruction of the UE 1 includes the adjusted feedback interval information, after receiving the feedback adjustment instruction, the Rx UE may determine, according to time when new first data is received and the adjusted feedback interval information, a second time slot for sending feedback information to the UE 1. Then, the Rx UE may send corresponding feedback information to the UE 1 in the second time slot according to the designated frequency f1.

When the feedback adjustment instruction of the UE 1 includes the adjusted reception time information, after receiving the feedback adjustment instruction, the Rx UE may determine, according to the adjusted reception time information and feedback interval information, a second time slot for sending the feedback information to the UE 1. Then, the Rx UE may send corresponding feedback information to the UE 1 in the second time slot according to the designated frequency.

When the feedback adjustment instruction of the UE 1 includes the adjusted designated frequency f2 and the adjusted feedback interval information, after receiving the feedback adjustment instruction, the Rx UE may determine, according to time when the first data is received and the adjusted feedback interval information, a second time slot for sending the feedback information to the UE 1. Then, the Rx UE may send corresponding feedback information to the UE 1 in the second time slot according to the adjusted designated frequency f2.

When the feedback adjustment instruction of the UE 1 includes the adjusted designated frequency f2 and the adjusted reception time information, after receiving the feedback adjustment instruction, the Rx UE may determine, according to the adjusted reception time information and feedback interval information, a second time slot for sending the feedback information to the UE 1. Then, the Rx UE may send corresponding feedback information to the UE 1 in the second time slot according to the adjusted designated frequency f2.

According to the method for data feedback processing provided in this embodiment of the present disclosure, in various scenarios of V2X, upon determining that the first terminal is required to provide simultaneous feedback for a plurality of pieces of first data in the first time slot, the first terminal can quickly formulate a corresponding feedback manner, so as to ensure that the feedback information can be received.

Figure 3:
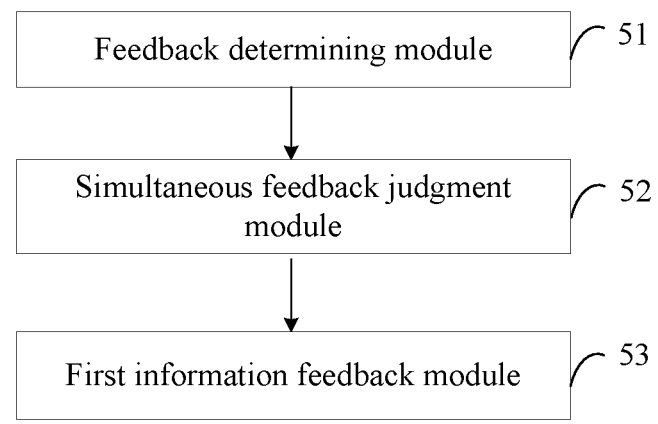
FIG. 3 is a block diagram of a device for data feedback processing according to an embodiment of the present disclosure.

FIG. 3 is a block diagram of a device for data feedback processing according to an embodiment of the present disclosure. As shown in FIG. 3, the device is applied to a first terminal, and the device includes: a feedback determining module 51, a simultaneous feedback judgment module 52, and a first information feedback module 53.

The feedback determining module 51, upon determining that feedback is required to be provided, in a first time slot, for first data sent by a plurality of second terminals, determines the plurality of second terminals as feedback receiving terminals.

The simultaneous feedback judgment module 52 determines whether the first terminal supports simultaneous feedback.

The first information feedback module 53 respectively sends, based on a plurality of consecutive feedback resources, in the first time slot over a designated frequency upon determining that the first terminal supports simultaneous feedback, corresponding feedback information to the plurality of feedback receiving terminals, where the feedback information is used to indicate a receiving status of the first terminal for the first data.

In a possible implementation, the simultaneous feedback judgment module 52 may include: a judgment submodule, which determines, according to at least one of a transmission power supported by the first terminal, a distribution status of feedback resources obtained, feedback information that is required to be sent, and a feedback transmission power required to transmit the feedback information, whether the first terminal supports simultaneous feedback.

In a possible implementation, the device may include: a transmission power determining module, which determines, upon determining that the first terminal does not support simultaneous feedback, according to path losses of sidelinks between the first terminal and the feedback receiving terminals, a feedback transmission power for sending the feedback information to the feedback receiving terminals; a target terminal determining module, which determines whether the first terminal can send, at the feedback transmission power, the feedback information to the feedback receiving terminals, and determines, as a target terminal, a feedback receiving terminal that enables the first terminal to perform feedback information transmission at the feedback transmission power; and a second information feedback module, which sends, in a case of one target terminal, in the first time slot over the designated frequency, the feedback information to the target terminal.

In a possible implementation, the device may include: a priority level determining module, which selects, in a case of more than one target terminal, from a plurality of target terminals according to the service priority level, the target terminal having the highest service priority level; and a third information feedback module, which sends, in the first time slot over the designated frequency, the feedback information to the target terminal having the highest service priority level.

In a possible implementation, the device may include: an adjustment request sending module, which sends, upon determining that the first terminal does not support simultaneous feedback, a feedback adjustment request to at least one of the plurality of feedback receiving terminals, where the feedback adjustment request includes at least one of an adjustment to feedback interval information, an adjustment to reception time information about reception of the first data, and an adjustment to a designated frequency; an adjustment instruction receiving module, which receives a feedback adjustment instruction sent by the feedback receiving terminal in response to the feedback adjustment request, where the feedback adjustment instruction includes at least one of adjusted feedback interval information, adjusted reception time information, and an adjusted designated frequency; and a fourth information feedback module, which respectively sends, according to the feedback adjustment instruction, the corresponding feedback information to the plurality of feedback receiving terminals.

In a possible implementation, the fourth information feedback module may include at least one of the following submodules: a first sending submodule, which sends, in a second time slot over the adjusted designated frequency, corresponding feedback information to a feedback receiving terminal that sends a corresponding feedback adjustment instruction; a second sending submodule, which sends, in a second time slot over the designated frequency, corresponding feedback information to a feedback receiving terminal that sends a corresponding feedback adjustment instruction; or a third sending submodule, which sends, in a second time slot over the adjusted designated frequency, corresponding feedback information to a feedback receiving terminal that sends a corresponding feedback adjustment instruction.

It should be noted that although the foregoing embodiment is taken as an example to describe the device for data feedback processing as above, persons skilled in the art can understand that the present disclosure should not be limited thereto. In fact, a user can flexibly set the modules completely according to personal preferences and/or actual application scenarios, as long as the modules conform to the technical solution of the present disclosure.

According to the device for data feedback processing provided in this embodiment of the present disclosure, in various scenarios of V2X, upon determining that the first terminal is required to provide information feedback, in a first time slot, for a plurality of pieces of first data simultaneously, the first terminal can quickly formulate a corresponding feedback manner, so as to ensure that the feedback information can be received by feedback receiving terminals.

Figure 4:
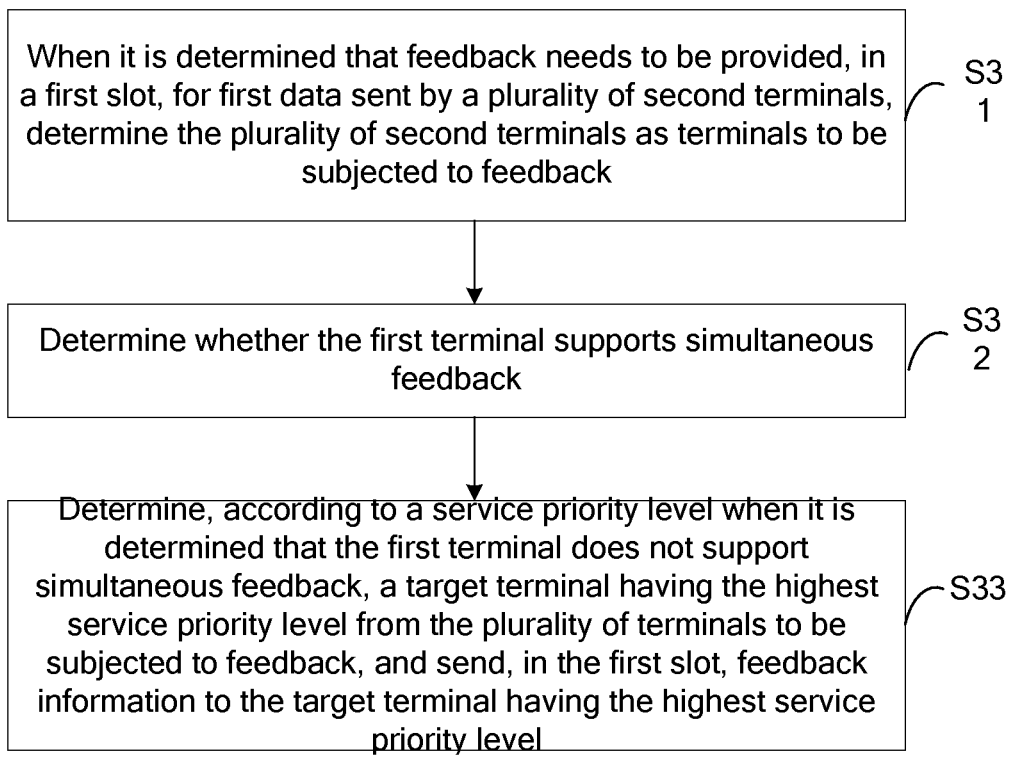
FIG. 4 is a flowchart of a method for data feedback processing according to an embodiment of the present disclosure.

FIG. 4 is a flowchart of a method for data feedback processing according to an embodiment of the present disclosure. As shown in FIG. 4, the method may be applied to a first terminal, and the method includes steps S31 to S33.

In S31, upon determining that feedback is required to be provided, in a first time slot, for first data sent by a plurality of second terminals, the plurality of second terminals are determined as feedback receiving terminals.

In S32, whether the first terminal supports simultaneous feedback is determined.

In S33, upon determining that the first terminal does not support simultaneous feedback, a target terminal having the highest service priority level from the plurality of feedback receiving terminals is determined according to a service priority level, and feedback information are sent, in the first time slot, to the target terminal having the highest service priority level, where the feedback information is used to indicate a receiving status of the first terminal for the first data.

In the foregoing manner, in various scenarios of V2X, upon determining that the first terminal is required to provide simultaneous feedback for a plurality of pieces of first data, the first terminal can quickly formulate a corresponding feedback manner, so as to ensure that the feedback information can be received by feedback receiving terminals. In addition, when the first terminal does not support simultaneous feedback, it can be ensured that a terminal having the highest service priority level can still receive the feedback information in time.

In a possible implementation, the service priority level includes a first data priority level and/or a second terminal priority level.

In a possible implementation, the method includes: respectively sending, in the first time slot upon determining that the first terminal supports simultaneous feedback, corresponding feedback information to the plurality of feedback receiving terminals.

In this implementation, upon determining that the first terminal supports simultaneous feedback, it may be further determined whether feedback resources used to send the feedback information are consecutive. If the feedback resources are not consecutive, the feedback information can still be sent based on the feedback resources that are not consecutive. In a process of sending the feedback information, it is required to preset (or randomly allocate) a correspondence between the feedback receiving terminals and the feedback resources, so as to send the feedback information over a corresponding feedback resource. In this way, it can be ensured that the feedback information for the plurality of feedback receiving terminals is sent accurately and in time.

If the feedback resources are consecutive, in a possible implementation, the respectively sending, in the first time slot upon determining that the first terminal supports simultaneous feedback, corresponding feedback information to the plurality of feedback receiving terminals includes: respectively sending, based on a plurality of consecutive feedback resources, in the first time slot upon determining that the first terminal supports simultaneous feedback, corresponding feedback information to the plurality of feedback receiving terminals. In this way, operations required for sending the feedback information can be simplified, and the speed and efficiency of sending the feedback information can be improved.

In a possible implementation, the determining whether the first terminal supports simultaneous feedback may include: determining, according to at least one of a transmission power supported by the first terminal, a distribution status of feedback resources obtained, feedback information that is required to be sent, and a feedback transmission power required to transmit the feedback information, whether the first terminal supports simultaneous feedback.

In a possible implementation, the determining, according to a service priority level upon determining that the first terminal does not support simultaneous feedback, a target terminal having the highest service priority level from the plurality of feedback receiving terminals, and sending, in the first time slot, feedback information to the target terminal having the highest service priority level includes: upon determining that the first terminal does not support simultaneous feedback, determining, according to path losses of sidelinks between the first terminal and the feedback receiving terminals, a feedback transmission power for sending the feedback information to the feedback receiving terminals; determining whether the first terminal can send, at the feedback transmission power, the feedback information to the feedback receiving terminals, and determining, as a target terminal, a feedback receiving terminal that enables the first terminal to perform feedback information transmission at the feedback transmission power; in a case of more than one target terminal, selecting the target terminal having the highest service priority level from a plurality of target terminals according to the service priority level; and sending, in the first time slot, the feedback information to the target terminal having the highest service priority level.

In a possible implementation, the method includes: upon determining that the first terminal does not support simultaneous feedback, sending a feedback adjustment request to at least one of the plurality of feedback receiving terminals, where the feedback adjustment request includes at least one of an adjustment to feedback interval information, an adjustment to reception time information about reception of the first data, and an adjustment to a designated frequency; receiving a feedback adjustment instruction sent by the feedback receiving terminal in response to the feedback adjustment request, where the feedback adjustment instruction includes at least one of adjusted feedback interval information, adjusted reception time information, and an adjusted designated frequency; and respectively sending, according to the feedback adjustment instruction, the corresponding feedback information to the plurality of feedback receiving terminals.

In a possible implementation, the respectively sending, according to the feedback adjustment instruction, the corresponding feedback information to the plurality of feedback receiving terminals includes at least one of the following: sending, in a second time slot over the adjusted designated frequency, corresponding feedback information to a feedback receiving terminal that sends a corresponding feedback adjustment instruction; sending, in a second time slot over the designated frequency, corresponding feedback information to a feedback receiving terminal that sends a corresponding feedback adjustment instruction; or sending, in a second time slot over the adjusted designated frequency, corresponding feedback information to a feedback receiving terminal that sends a corresponding feedback adjustment instruction.

Figure 5:
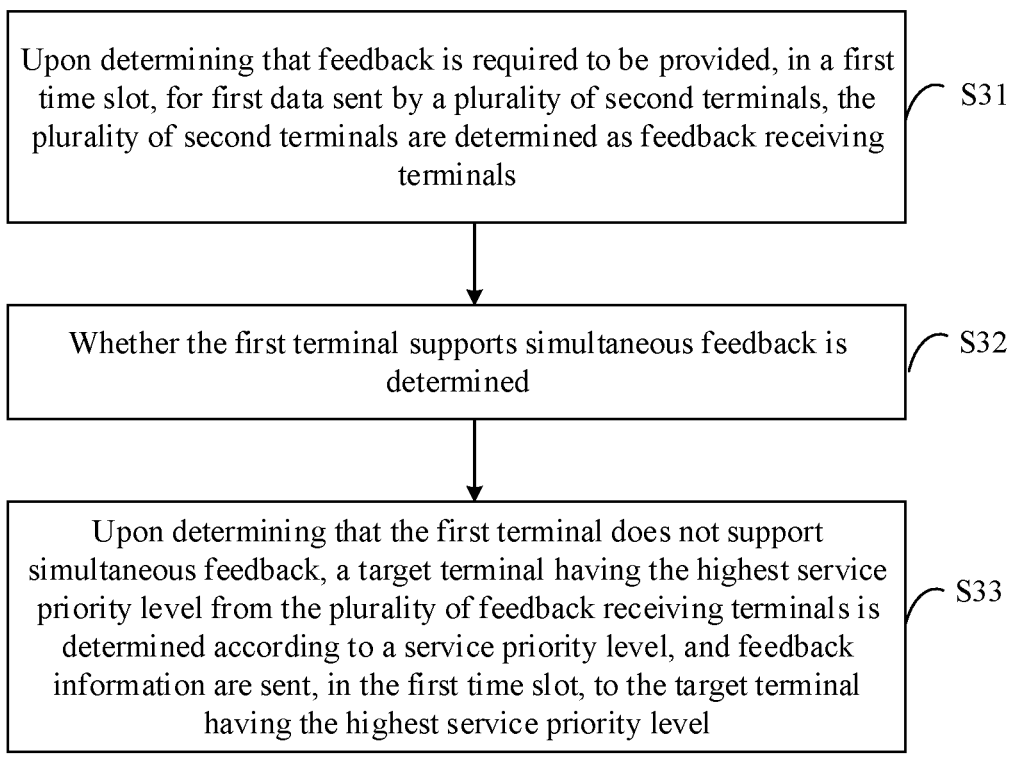
FIG. 5 is a block diagram of a device for data feedback processing according to an embodiment of the present disclosure.

FIG. 5 is a block diagram of a device for data feedback processing according to an embodiment of the present disclosure. As shown in FIG. 5, the device is applied to a first terminal, and the device includes: a feedback determining module 61, a simultaneous feedback judgment module 62, and a first feedback module 63.

The feedback determining module 61, upon determining that feedback is required to be provided, in a first time slot, for first data sent by a plurality of second terminals, determines the plurality of second terminals as feedback receiving terminals.

The simultaneous feedback judgment module 62 determines whether the first terminal supports simultaneous feedback.

The first feedback module 63 determines, according to a service priority level upon determining that the first terminal does not support simultaneous feedback, a target terminal having the highest service priority level from the plurality of feedback receiving terminals, and sends, in the first time slot, feedback information to the target terminal having the highest service priority level, where the feedback information is used to indicate a receiving status of the first terminal for the first data.

For detailed implementation of the feedback determining module 61 and the simultaneous feedback judgment module 62, reference may be made to the descriptions of the feedback determining module 51 and the simultaneous feedback judgment module 52 respectively, and details are not described herein again.

In a possible implementation, the service priority level includes a first data priority level and/or a second terminal priority level.

In a possible implementation, the device includes: a second feedback module, which respectively sends, in the first time slot upon determining that the first terminal supports simultaneous feedback, corresponding feedback information to the plurality of feedback receiving terminals.

In a possible implementation, the second feedback module is configured to respectively send, based on a plurality of consecutive feedback resources, in the first time slot upon determining that the first terminal supports simultaneous feedback, corresponding feedback information to the plurality of feedback receiving terminals.

In a possible implementation, the simultaneous feedback judgment module includes: a judgment submodule, which determines, according to at least one of a transmission power supported by the first terminal, a distribution status of feedback resources obtained, feedback information that is required to be sent, and a feedback transmission power required to transmit the feedback information, whether the first terminal supports simultaneous feedback.

In a possible implementation, the first feedback module is configured to: upon determining that the first terminal does not support simultaneous feedback, determine, according to path losses of sidelinks between the first terminal and the feedback receiving terminals, a feedback transmission power for sending the feedback information to the feedback receiving terminals; determine whether the first terminal can send, at the feedback transmission power, the feedback information to the feedback receiving terminals, and determine, as a target terminal, a feedback receiving terminal that enables the first terminal to perform feedback information transmission at the feedback transmission power; in a case of more than one target terminal, select the target terminal having the highest service priority level from a plurality of target terminals according to the service priority level; and send, in the first time slot, the feedback information to the target terminal having the highest service priority level.

In a possible implementation, the device includes: an adjustment request sending module, which sends, upon determining that the first terminal does not support simultaneous feedback, a feedback adjustment request to at least one of the plurality of feedback receiving terminals, where the feedback adjustment request includes at least one of an adjustment to feedback interval information, an adjustment to reception time information about reception of the first data, and an adjustment to a designated frequency; an adjustment instruction receiving module, which receives a feedback adjustment instruction sent by the feedback receiving terminal in response to the feedback adjustment request, where the feedback adjustment instruction includes at least one of adjusted feedback interval information, adjusted reception time information, and an adjusted designated frequency; and a fourth feedback module, which respectively sends, according to the feedback adjustment instruction, corresponding feedback information to the plurality of feedback receiving terminals.

In a possible implementation, the fourth feedback module includes at least one of the following submodules: a first sending submodule, which sends, in a second time slot over the adjusted designated frequency, corresponding feedback information to a feedback receiving terminal that sends a corresponding feedback adjustment instruction; a second sending submodule, which sends, in a second time slot over the designated frequency, corresponding feedback information to a feedback receiving terminal that sends a corresponding feedback adjustment instruction; or a third sending submodule, which sends, in a second time slot over the adjusted designated frequency, corresponding feedback information to a feedback receiving terminal that sends a corresponding feedback adjustment instruction.

In the foregoing manner, in various scenarios of V2X, upon determining that the first terminal is required to provide simultaneous feedback for a plurality of pieces of first data, the first terminal can quickly formulate a corresponding feedback manner, so as to ensure that the feedback information can be received by feedback receiving terminals. In addition, when the first terminal does not support simultaneous feedback, it can be ensured that a terminal having the highest service priority level can still receive the feedback information in time.

It should be noted that, for implementations of the related steps of the foregoing method and the related modules of the device, reference may be made to the related descriptions above.

Figure 6:
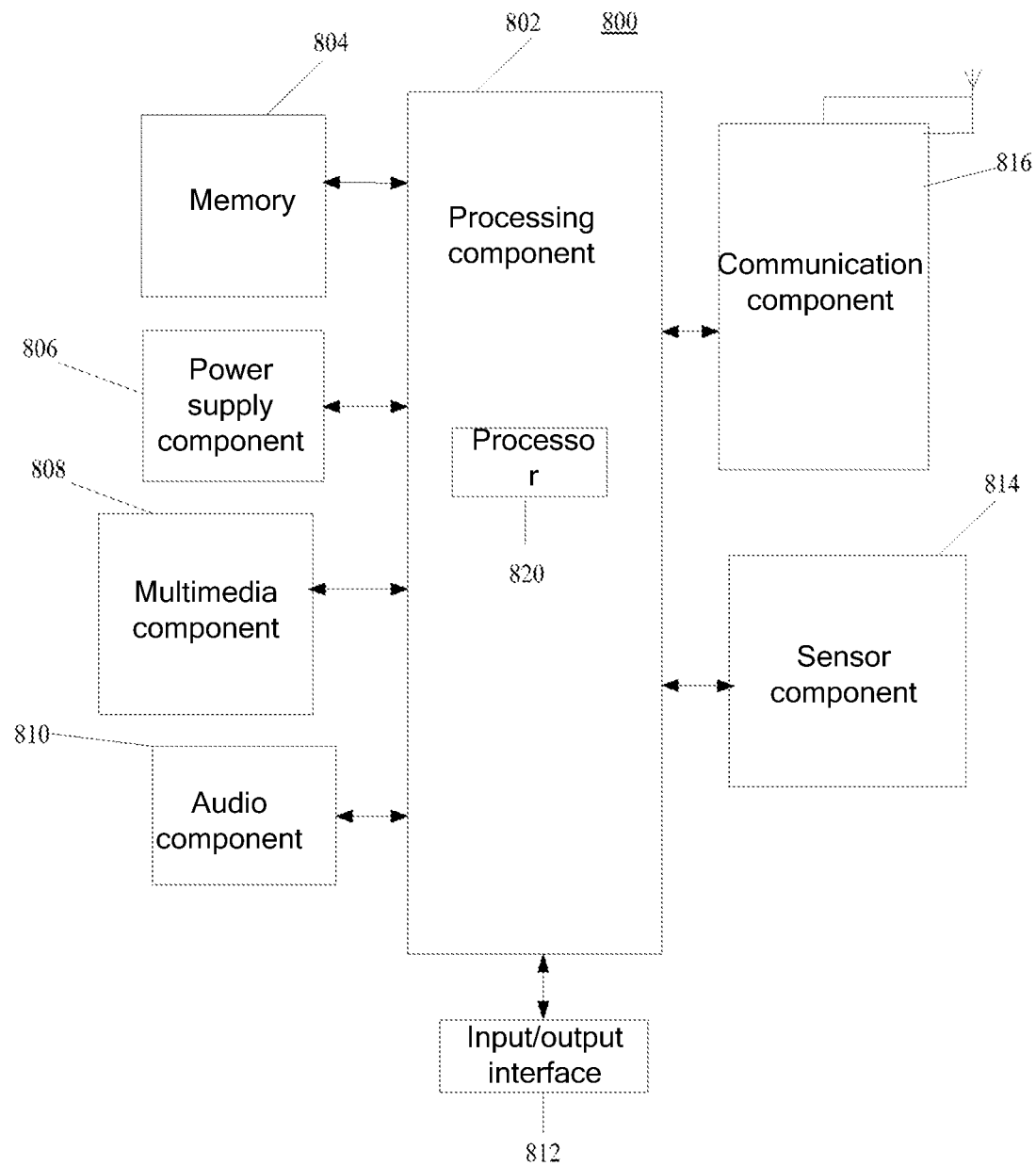
FIG. 6 is a block diagram of a device for data feedback processing according to an embodiment of the present disclosure.

FIG. 6 is a block diagram of a device for data feedback processing according to an embodiment of the present disclosure. For example, a device 800 may be a mobile phone, a computer, a digital broadcast terminal, a message transceiving device, a game console, a tablet device, a medical device, a fitness device, a personal digital assistant, and the like.

Referring to FIG. 6, the device 800 may include one or more of the following components: a processing component 802, a memory 804, a power supply component 806, a multimedia component 808, an audio component 810, an input/output (I/O) interface 812, a sensor component 814, and a communication component 816.

The processing component 802 typically controls an overall operation of the device 800, for example, operations associated with display, phone calls, data communications, camera operations, and recording operations. The processing component 802 may include one or more processors 820 for executing instructions, so as to perform all or some of the steps of the method described above. In addition, the processing component 802 may include one or more modules that facilitate interaction between the processing component 802 and other components. For example, the processing component 802 may include a multimedia module to facilitate interaction between the multimedia component 808 and the processing component 802.

The memory 804 is configured to store various types of data to support operations on the device 800. Examples of such data include instructions for any application or method operating on the device 800, contact data, phone book data, messages, pictures, videos, etc. The memory 804 may be implemented by any type of volatile or non-transitory storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 806 supplies power to various components of the device 800. The power supply component 806 may include a power management system, one or more power supplies, and other components associated with power generation, management, and distribution for the device 800.

The multimedia component 808 includes a screen that provides an output interface between the device 800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and finger gestures on the touch panel. The touch sensors may not only sense the boundaries of the touch or swipe action, but also detect the duration and pressure associated with the touch or swipe action. In some embodiments, the multimedia component 808 includes a front-facing camera and/or a rear-facing camera. The front-facing camera and/or the rear-facing camera can receive external multimedia data when the device 800 is in an operating mode, such as a shooting mode or a video mode. Each front-facing camera and rear-facing camera may be a fixed optical lens system or have a focal length and optical zoom capability.

The audio component 810 is configured to output and/or input audio signals. For example, the audio component 810 includes a microphone (MIC) configured to receive external audio signals when the device 800 is in an operating mode, such as a call mode, a recording mode, and a voice recognition mode. The received audio signal may be further stored in the memory 804 or sent via the communication component 816. In some embodiments, the audio component 810 includes a speaker for outputting audio signals.

The I/O interface 812 provides an interface between the processing component 802 and a peripheral interface module, and the peripheral interface module may be a keyboard, a click wheel, a button, etc. The buttons may include, but are not limited to: a homepage button, a volume button, a start button, and a lock button.

The sensor component 814 includes one or more sensors for providing status assessment of various aspects of the device 800. For example, the sensor component 814 may detect an on/off state of the device 800 and relative positions of the components, for example, the component is a display and a keypad of the device 800. The sensor component 814 may detect position changes of the device 800 or a component of the device 800, presence or absence of contact between the user and the device 800, orientation of the device 800 or acceleration/deceleration of the device 800, and temperature changes of the device 800. The sensor component 814 may include a proximity sensor configured to detect presence of nearby objects without any physical contact. The sensor component 814 may include an optical sensor, such as a CMOS or CCD image sensor, for use in imaging applications. In some embodiments, the sensor component 814 may include an accelerometer sensor, a gyroscope sensor, a magnetic sensor, a pressure sensor, or a temperature sensor.

The communication component 816 is configured to facilitate communication between the device 800 and other devices by wired or wireless means. The device 800 can access a wireless network which is based on a communications standard, such as Wi-Fi, 3Q or a combination thereof. In an exemplary embodiment, the communication component 816 receives broadcast signals or broadcast-related information from an external broadcast management system via a broadcast channel. In an exemplary embodiment, the communication component 816 includes a near-field communication (NFC) module to facilitate short-range communication. For example, the NFC module may be implemented on the basis of a radio frequency identification (RFID) technology, an infrared data association (IrDA) technology, an ultra-wideband (UWB) technology, a Bluetooth (BT) technology, and other technologies.

In an exemplary embodiment, the device 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the method described above.

In an exemplary embodiment, a non-transitory computer-readable storage medium is further provided, for example a memory 804 including computer program instructions. The above computer program instructions may be executed by the processor 820 of the device 800 to complete the above method.

The present disclosure may be a system, method, and/or computer program product. The computer program product may include a computer-readable storage medium loaded with computer-readable program instructions for enabling a processor to implement various aspects of the present disclosure.

The computer-readable storage medium may be a tangible device that can retain and store instructions used by an instruction execution device. The computer-readable storage medium may be, for example but not limited to, an electrical storage device, a magnetic storage device, an optical storage device, an electromagnetic storage device, a semiconductor storage device, or any combination thereof. More examples (non-exhaustive list) of computer-readable storage media include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punched card or a protruding structure in a groove having instructions stored thereon, and any suitable combination thereof. The computer-readable storage medium used herein is not interpreted as a transient signal itself, such as a radio wave or other freely propagating electromagnetic waves, electromagnetic waves propagating through waveguides or other transmission media (for example, optical pulses through fiber optic cables), or electrical signals transmitted through wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network, and forwards the computer-readable program instructions for storage in the computer-readable storage medium in each computing/processing device.

The computer program instructions used to perform the operations of the present disclosure may be assembly instructions, instruction set architecture (ISA) instructions, machine instructions, machine-dependent instructions, microcode, firmware instructions, status setting data, or source code or object code written in any combination of one or more programming languages. The programming languages include object-oriented programming languages such as Smalltalk, C++, etc., and conventional procedural programming languages such as the "C" language or similar programming languages. The computer-readable program instructions may be completely executed on a computer of a user, partially executed on a computer of a user, executed as an independent software package, partially executed on a computer of a user and partially executed on a remote computer, or completely executed on a remote computer or server. In a circumstance in which a remote computer is involved, the remote computer may be connected to a user computer via any type of network, including a local area network (LAN) or a wide area network (WAN), or may be connected to an external computer (for example, connected via the Internet by using an Internet service provider). In some embodiments, an electronic circuit, such as a programmable logic circuit, a field-programmable gate array (FPGA), or a programmable logic array (PLA), may be customized by using status information of the computer-readable program instructions, and the electronic circuit may execute the computer-readable program instructions, thereby implementing various aspects of the present disclosure.

The various aspects of the present disclosure are described herein with reference to the flowcharts and/or block diagrams of the method, the device (system), and the computer program product according to the embodiments of the present disclosure. It should be understood that each block of the flowcharts and/or block diagrams and a combination of blocks of the flowcharts and/or block diagrams can be implemented by using computer-readable program instructions.

These computer-readable program instructions may be provided to a processor of a general-purpose computer, a dedicated computer, or other programmable data processing devices to generate a machine, so that when these instructions are executed by the processor of the computer or the other programmable data processing device, a device for implementing the functions/actions specified in one or more blocks of the flowcharts and/or block diagrams is generated. Alternatively, these computer-readable program instructions may be stored in a computer-readable storage medium, and the instructions can instruct a computer, other programmable data processing device, and/or other device to work in a specific manner, so that a computer-readable medium storing the instructions includes a manufactured product containing instructions that implement various aspects of the functions/actions specified in one or more blocks of the flowcharts and/or the block diagrams.

Alternatively, these computer-readable program instructions may be loaded onto the computer, the other programmable data processing device, or the other device, so that a series of operations and steps are performed on the computer, the other programmable data processing device, or the other device, to generate a computer-implemented process. As such, the instructions executed on the computer, the other programmable data processing device, or the other device implement the functions/actions specified in one or more blocks of the flowcharts and/or the block diagrams.

The flowcharts and the block diagrams in the accompanying drawings illustrate the possibly implemented architecture, functions, and operations of the system, method, and computer program product according to a plurality of embodiments of the present disclosure. Each block in the flowcharts or block diagrams may represent a module, a program segment, or a part of instructions, and the module, the program segment, or the part of instructions contains one or more executable instructions used for implementing specified logical functions. In some alternative implementations, the functions marked in the blocks may also occur in an order different from that marked in the accompanying drawings. For example, two consecutive blocks can actually be executed in parallel, or sometimes can be executed in a reverse order, depending on the functions involved. It should also be noted that each block in the flowcharts and/or block diagrams and combinations of the blocks in the flowcharts and/or block diagrams may be implemented by a dedicated hardware-based system for executing specified functions or actions, or may be implemented by a combination of dedicated hardware and computer instructions.

The embodiments of the present disclosure have been described above, and the above description is merely exemplary, not exhaustive, and is not limited to the disclosed embodiments. Those skilled in the art can make various modifications and changes without departing from the scope of the described embodiments. The terms used herein are intended to better explain principles of the embodiments, practical applications, or improvements to technologies in the market, or to enable other persons of ordinary skill in the art to understand the embodiments disclosed herein.

What is claimed is:

1. A method for data feedback processing, applied to a first terminal, the method comprising:
   determining a plurality of second terminals as feedback receiving terminals, upon determining that feedback is required to be provided in a first time slot for first data sent by the plurality of second terminals;
   determining whether the first terminal supports simultaneous feedback;
   determining, according to a service priority level upon determining that the first terminal does not support simultaneous feedback, a target terminal having the highest service priority level from the plurality of feedback receiving terminals, and sending, in the first time slot, feedback information to the target terminal having the highest service priority level, and
   respectively sending, based on a plurality of feedback resources, in the first time slot upon determining that the first terminal supports simultaneous feedback, corresponding feedback information to the plurality of feedback receiving terminals,
   wherein the feedback information is configured to indicate a receiving status of the first terminal for the first data.

2. The method according to claim 1, wherein the service priority level comprises a first data priority level and/or a second terminal priority level.

3. The method according to claim 1, wherein said respectively sending, in the first time slot upon determining that the first terminal supports simultaneous feedback, corresponding feedback information to the plurality of feedback receiving terminals comprises:
   respectively sending, based on a plurality of consecutive feedback resources, in the first time slot upon determining that the first terminal supports simultaneous feedback, corresponding feedback information to the plurality of feedback receiving terminals.

4. The method according to claim 1, wherein said determining whether the first terminal supports simultaneous feedback comprises:
   determining, according to at least one of a transmission power supported by the first terminal, a distribution status of feedback resources obtained, feedback information that is required to be sent, and a feedback transmission power required to transmit the feedback information, whether the first terminal supports simultaneous feedback.

5. The method according to claim 1, wherein said determining, according to a service priority level upon determining that the first terminal does not support simultaneous feedback, a target terminal having the highest service priority level from the plurality of feedback receiving terminals, and sending, in the first time slot, feedback information to the target terminal having the highest service priority level comprises:
  upon determining that the first terminal does not support simultaneous feedback, determining, according to path losses of sidelinks between the first terminal and the feedback receiving terminals, a feedback transmission power for sending the feedback information to the feedback receiving terminals;
  determining whether the first terminal is capable of sending, at the feedback transmission power, the feedback information to the feedback receiving terminals, and determining, as a target terminal, a feedback receiving terminal that enables the first terminal to perform feedback information transmission at the feedback transmission power;
  in a case of more than one target terminal, selecting a target terminal having the highest service priority level from of the more than one target terminal according to the service priority level; and
  sending, in the first time slot, the feedback information to the target terminal having the highest service priority level.

6. The method according to claim 1, further comprising:
  upon determining that the first terminal does not support simultaneous feedback, sending a feedback adjustment request to at least one of the plurality of feedback receiving terminals, wherein the feedback adjustment request comprises at least one of an adjustment to feedback interval information, an adjustment to reception time information about reception of the first data, and an adjustment to a designated frequency;
  receiving a feedback adjustment instruction sent by the feedback receiving terminal in response to the feedback adjustment request, wherein the feedback adjustment instruction comprises at least one of adjusted feedback interval information, adjusted reception time information, and an adjusted designated frequency; and
  respectively sending, according to the feedback adjustment instruction, corresponding feedback information to the plurality of feedback receiving terminals.

7. The method according to claim 6, wherein said respectively sending, according to the feedback adjustment instruction, corresponding feedback information to the plurality of feedback receiving terminals comprises at least one of:
  sending, in a second time slot over the adjusted designated frequency, corresponding feedback information to a feedback receiving terminal that sends a corresponding feedback adjustment instruction;
  sending, in a second time slot over the designated frequency, corresponding feedback information to a feedback receiving terminal that sends a corresponding feedback adjustment instruction; or
  sending, in a second time slot over the adjusted designated frequency, corresponding feedback information to a feedback receiving terminal that sends a corresponding feedback adjustment instruction.

8. A device for data feedback processing, applied to a first terminal, the device comprising:
  a memory; and
  at least one processor coupled to the memory and configured to:
    determine, upon determining that feedback is required to be provided in a first time slot for first data sent by a plurality of second terminals, wherein the plurality of second terminals are determined as feedback receiving terminals;
    determine whether the first terminal supports simultaneous feedback;
    determine, according to a service priority level upon determining that the first terminal does not support simultaneous feedback, a target terminal having the highest service priority level from the plurality of feedback receiving terminals, and send, in the first time slot, feedback information to the target terminal having the highest service priority level, and
    respectively send, based on a plurality of feedback resources, in the first time slot upon determining that the first terminal supports simultaneous feedback, corresponding feedback information to the plurality of feedback receiving terminals,
  wherein the feedback information is configured to indicate a receiving status of the first terminal for the first data.

9. The device according to claim 8, wherein the service priority level comprises a first data priority level and/or a second terminal priority level.

10. The device according to claim 8, wherein the at least one process is configured to:
  respectively send, based on a plurality of consecutive feedback resources, in the first time slot upon determining that the first terminal supports simultaneous feedback, corresponding feedback information to the plurality of feedback receiving terminals.

11. The device according to claim 8, wherein the at least one process is configured to:
  determine, according to at least one of a transmission power supported by the first terminal, a distribution status of feedback resources obtained, feedback information that is required to be sent, and a feedback transmission power required to transmit the feedback information, whether the first terminal supports simultaneous feedback.

12. The device according to claim 8, wherein the at least one process is configured to:
  upon determining that the first terminal does not support simultaneous feedback, determine, according to path losses of sidelinks between the first terminal and the feedback receiving terminals, a feedback transmission power for sending the feedback information to the feedback receiving terminals;
  determine whether the first terminal is capable of sending, at the feedback transmission power, the feedback information to the feedback receiving terminals, and determine, as a target terminal, a feedback receiving terminal that enables the first terminal to perform feedback information transmission at the feedback transmission power;
  in a case of more than one target terminal, select a target terminal having the highest service priority level from the more than one target terminal according to the service priority level; and
  send, in the first time slot, the feedback information to the target terminal having the highest service priority level.

13. The device according to any one of claim 8, wherein the at least one process is configured to:
  send, upon determining that the first terminal does not support simultaneous feedback, a feedback adjustment request to at least one of the plurality of feedback receiving terminals, wherein the feedback adjustment request comprises at least one of an adjustment to feedback interval information, an adjustment to reception time information about reception of the first data, and an adjustment to a designated frequency;

receive a feedback adjustment instruction sent by the feedback receiving terminal in response to the feedback adjustment request, wherein the feedback adjustment instruction comprises at least one of adjusted feedback interval information, adjusted reception time information, and an adjusted designated frequency; and respectively send, according to the feedback adjustment instruction, corresponding feedback information to the plurality of feedback receiving terminals.

14. The device according to claim 13, wherein the at least one process is configured to:

send, in a second time slot over the adjusted designated frequency, corresponding feedback information to a feedback receiving terminal that sends a corresponding feedback adjustment instruction;

send, in a second time slot over the designated frequency, corresponding feedback information to a feedback receiving terminal that sends a corresponding feedback adjustment instruction; or send, in a second time slot over the adjusted designated frequency, corresponding feedback information to a feedback receiving terminal that sends a corresponding feedback adjustment instruction.

15. A non-transitory processor-readable storage medium, having stored thereon processor-executable instructions configured to cause a first processor of a computing device to perform operations comprising:

determining a plurality of second terminals as feedback receiving terminals, upon determining that feedback is required to be provided in a first time slot for first data sent by the plurality of second terminals;

determining whether the first terminal supports simultaneous feedback;

determining, according to a service priority level upon determining that the first terminal does not support simultaneous feedback, a target terminal having the highest service priority level from the plurality of feedback receiving terminals, and sending, in the first time slot, feedback information to the target terminal having the highest service priority level, and respectively sending, based on a plurality of feedback resources, in the first time slot upon determining that the first terminal supports simultaneous feedback, corresponding feedback information to the plurality of feedback receiving terminals, wherein the feedback information is configured to indicate a receiving status of the first terminal for the first data.

16. The non-transitory processor-readable storage medium according to claim 15, wherein the service priority level comprises a first data priority level or a second terminal priority level.

17. The non-transitory processor-readable storage medium according to claim 15, wherein the first processor is configured to:

respectively send, based on a plurality of consecutive feedback resources, in the first time slot upon determining that the first terminal supports simultaneous feedback, corresponding feedback information to the plurality of feedback receiving terminals.

* * * * *